(12) United States Patent
Fujisawa et al.

(10) Patent No.: US 8,859,137 B2
(45) Date of Patent: *Oct. 14, 2014

(54) FUEL CELL SYSTEM

(75) Inventors: Kimiko Fujisawa, Wako (JP); Tetsuya Ogawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/637,151

(22) PCT Filed: Mar. 15, 2011

(86) PCT No.: PCT/JP2011/056679
§ 371 (c)(1),
(2), (4) Date: Sep. 25, 2012

(87) PCT Pub. No.: WO2011/132487
PCT Pub. Date: Oct. 27, 2011

(65) Prior Publication Data
US 2013/0029237 A1    Jan. 31, 2013

(30) Foreign Application Priority Data

Apr. 21, 2010    (JP) ................................ 2010-098217

(51) Int. Cl.
*H01M 8/24* (2006.01)
*H01M 8/06* (2006.01)
*H01M 8/04* (2006.01)
*H01M 8/12* (2006.01)

(52) U.S. Cl.
CPC .......... *H01M 8/2475* (2013.01); *H01M 8/2425* (2013.01); *Y02E 60/50* (2013.01); *H01M 8/0612* (2013.01); *H01M 8/0494* (2013.01); *H01M 2250/10* (2013.01); *H01M 8/04089* (2013.01); *H01M 2008/1293* (2013.01); *Y02E 60/525* (2013.01); *H01M 8/04388* (2013.01)

USPC .......... 429/163; 429/471; 361/616; 361/667; 312/223.5; 312/223.6

(58) Field of Classification Search
None
See application file for complete search history.

(56) References Cited

U.S. PATENT DOCUMENTS 3,175,126 A * 3/1965 Hardwick ...................... 361/616
6,142,802 A * 11/2000 Berg et al. ..................... 439/180

(Continued)

FOREIGN PATENT DOCUMENTS

JP    60-014606    1/1985
JP    09-009421    1/1997

(Continued)

OTHER PUBLICATIONS

U.S. Office Action of U.S. Appl. No. 13/637,147 dated Mar. 26, 2013, 21 pages.

(Continued)

*Primary Examiner* — Milton I Cano
*Assistant Examiner* — Wojciech Haske
(74) *Attorney, Agent, or Firm* — Rankin, Hill & Clark LLP (57) ABSTRACT

A fuel cell system includes a fuel cell module, a combustor, a fuel gas supply apparatus, an oxygen-containing gas supply apparatus, a water supply apparatus, a power converter, a control device, and a casing containing the fuel cell module, the combustor, the fuel gas supply apparatus, the oxygen-containing gas supply apparatus, the water supply apparatus, the power converter, and the control device. The casing includes a casing body having an opening in the front face and a slide door that is installed onto the casing body. When the slide door slides horizontally, the opening is opened/closed. The power converter and the control device are attached onto the slide door at upper and lower positions.

14 Claims, 12 Drawing Sheets

(56) References Cited

U.S. PATENT DOCUMENTS

| | | |
|---|---|---|
| 7,518,863 B2 | 4/2009 | Wayman et al. |
| 2011/0159391 A1 | 6/2011 | Saito et al. |

FOREIGN PATENT DOCUMENTS

| | | |
|---|---|---|
| JP | 2001-350434 | 12/2001 |
| JP | 2003-297409 | 10/2003 |
| JP | 2004-135373 | 4/2004 |
| JP | 2006-086017 | 3/2006 |
| JP | 2006-140164 | 6/2006 |
| JP | 2007-294296 | 11/2007 |
| JP | 2010-067352 | 3/2010 |
| WO | 2008/114570 | 9/2008 |
| WO | WO 2008114570 A1 * 9/2008 .............. H01M 8/04 |
| WO | WO 2008116486 A1 * 10/2008 .............. H04M 1/02 |
| WO | 2010/016397 | 2/2010 |

OTHER PUBLICATIONS

"Fuel Cell System", Kimiko Fujisawa et al., U.S. Appl. No. 13/637,147, filed Sep. 25, 2012,, Co-pending Application.
Japanese Office Action (Application No. 2010-098214) dated Nov. 12, 2013 and partial English translation, 5 pages.

* cited by examiner

PRIOR ART

FIG. 10

PRIOR ART

FUEL CELL SYSTEM

TECHNICAL FIELD

The present invention relates to a fuel cell system including a fuel cell module, a combustor, a fuel gas supply apparatus, an oxygen-containing gas supply apparatus, a water supply apparatus, a power converter, a control device, and a casing containing the fuel cell module, the combustor, the fuel gas supply apparatus, the oxygen-containing gas supply apparatus, the water supply apparatus, the power converter, and the control device.

BACKGROUND ART

Typically, a solid oxide fuel cell (SOFC) employs a solid electrolyte of ion-conductive oxide such as stabilized zirconia. The solid electrolyte is interposed between an anode and a cathode to form an electrolyte electrode assembly. The electrolyte electrode assembly is interposed between separators (bipolar plates). In use, normally, predetermined numbers of the electrolyte electrode assemblies and the separators are stacked together to form a fuel cell stack.

As the fuel gas supplied to the fuel cell, normally, a hydrogen gas produced from hydrocarbon raw material by a reformer is used. In general, in the reformer, a reformed raw material gas is obtained from hydrocarbon raw material of a fossil fuel or the like, such as methane or LNG, and the reformed raw material gas undergoes steam reforming, partial oxidation reforming, or autothermal reforming to produce a reformed gas (fuel gas).

In this regard, a fuel cell system having a single unit case containing a fuel cell, a reformer, a power converter for converting direct power electrical energy generated in the fuel cell according to a power supply output specification, a control device, and auxiliary devices is known.

Figure 10:
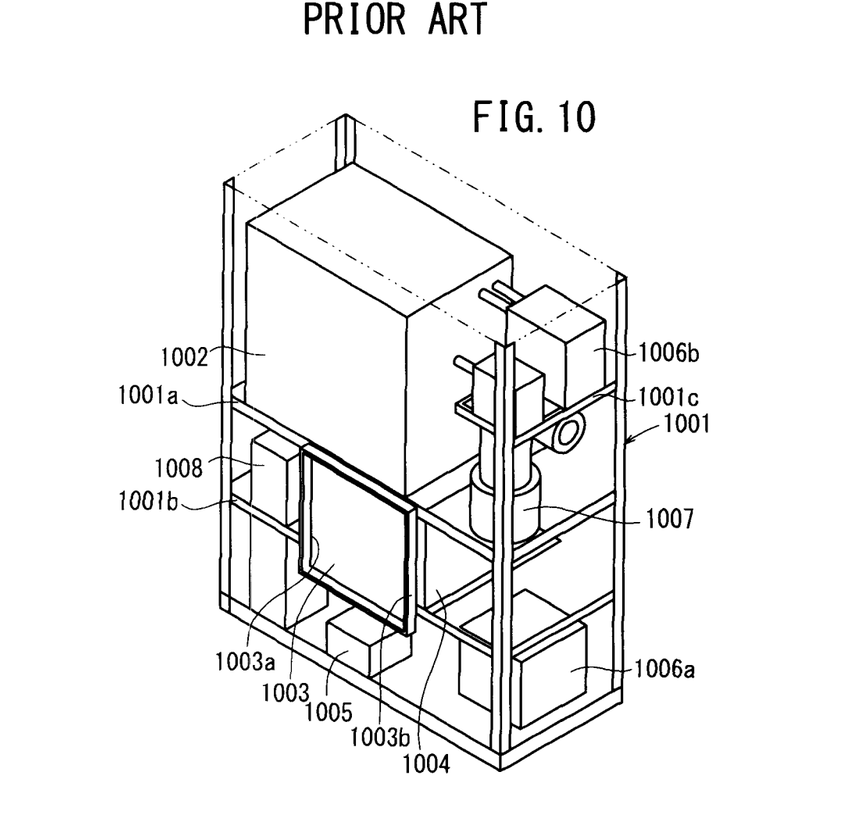
FIG. 10 is a perspective view schematically showing a fuel cell power supply apparatus disclosed in Japanese Laid-Open Patent Publication No. 2003-297409.

For example, in a fuel cell power supply apparatus disclosed in Japanese Laid-Open Patent Publication No. 2003-297409, as shown in FIG. 10, lateral bars 1001a, 1001b are provided in a frame 1001 of the unit case to vertically divide the space in the frame 1001 into three stages. A reformer 1002 is provided on the lateral bar 1001a in the upper stage, and a control device 1003 and a fuel cell 1004 are provided on the lateral bar 1001b in the middle stage such that back sides of the control device 1003 and the fuel cell 1004 face each other. Heat insulating material 1003a is provided on the back surface of the control device 1003, and heat insulating material 1003b is provided around the control device 1003 to protect the control device 1003 from the ambient hot environment.

Auxiliary devices such as a fuel pump 1005 for supplying a raw fuel to a reformer 1002 and an air pump 1006a for supplying an air as a reactant gas to the fuel cell 1004 are provided on the bottom plate of the frame 1001. An air pump 1006b for a reformer burner is provided on an auxiliary rack 1001c at an upper position of the frame 1001, and a PG burner 1007 is provided in front of the air pump 1006b for the reformer burner. A power converter 1008 is provided on a side of the fuel cell 1004 on the floor of the frame 1001.

Figure 11:
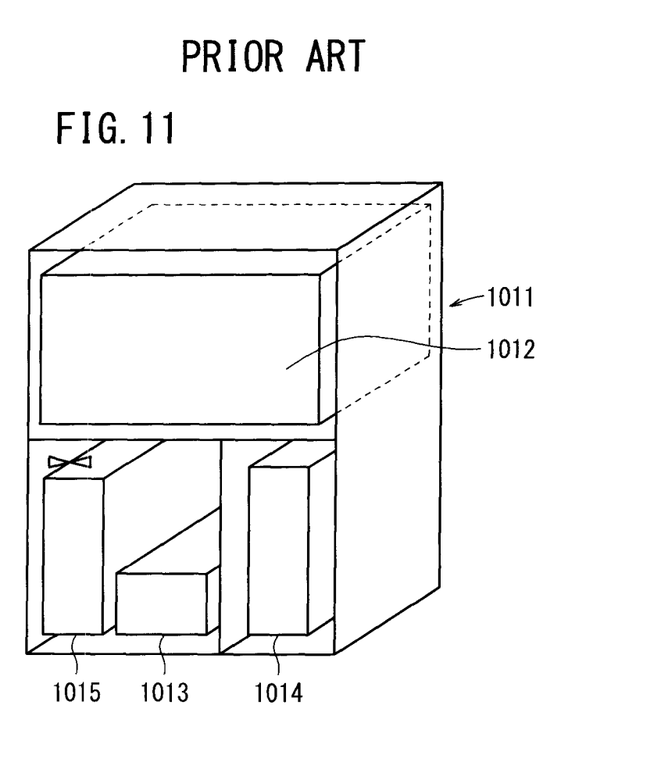
FIG. 11 is a perspective view schematically showing a fuel cell power generator apparatus disclosed in Japanese Laid-Open Patent Publication No. 2006-086017.

Further, for example, in a fuel cell generator apparatus disclosed in Japanese Laid-Open Patent Publication No. 2006-086017, as shown in FIG. 11, a case 1011 contains a fuel cell 1012, a fuel reformer for producing a fuel gas to be supplied to the fuel cell 1012, a gas supply apparatus 1013 for supplying a gas to be reformed to the fuel reformer, a water supply apparatus 1014 for supplying water to the fuel reformer, and a power converter 1015 for converting direct current electrical energy generated in the fuel cell 1012 into alternating current electrical energy, and supplying the alternating electrical energy to external loads.

The fuel cell 1012 and the fuel reformer are provided at an upper portion in the case 1011, and the power converter 1015, the water supply apparatus 1014, and the gas supply apparatus 1013 are arranged at a lower portion in the case 1011 such that the gas supply apparatus 1013 is positioned between the power converter 1015 and the water supply apparatus 1014.

Figure 12:
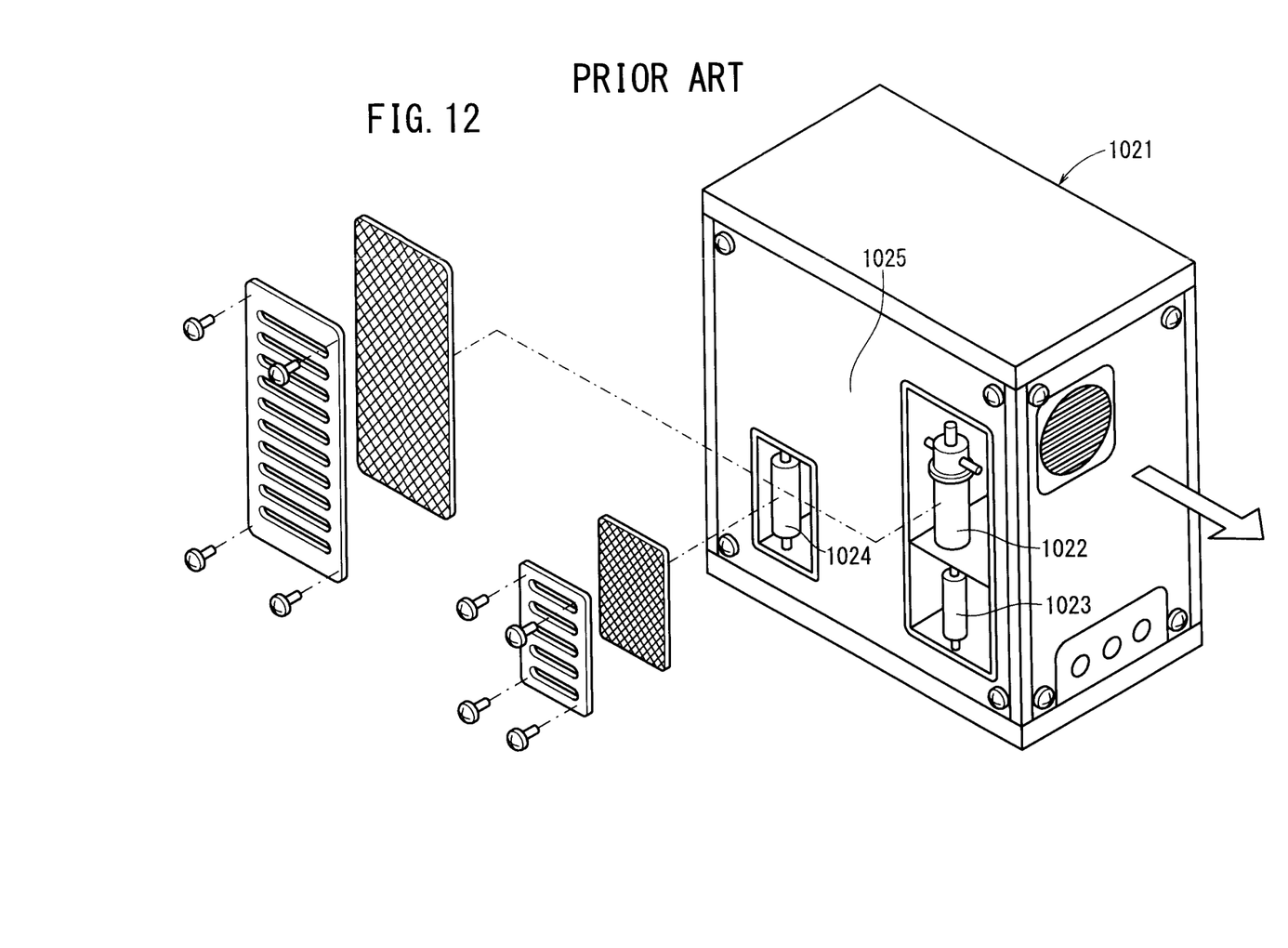
FIG. 12 is a partially exploded perspective view showing a fuel cell apparatus disclosed in Japanese Laid-Open Patent Publication No. 2006-140164.

Further, for example, in a fuel cell apparatus disclosed in Japanese Laid-Open Patent Publication No. 2006-140164, as shown in FIG. 12, a package 1021 is provided, and a purifier 1022, an ion exchanger 1023, and a desulfurizer 1024 are provided adjacent to a front panel 1025 serving as an outer panel of the package 1021. The purifier 1022, the ion exchanger 1023, and the desulfurizer 1024 are components that require maintenance.

Thus, the components that require maintenance are not provided inside the package 1021, but provided adjacent to the front panel 1025 serving as the outer profile of the apparatus body. According to the disclosure, in the structure, maintenance of the components that requires replacement, regeneration or the like for continuing operation of the fuel cell apparatus can be carried out easily.

SUMMARY OF INVENTION

In Japanese Laid-Open Patent Publication No. 2003-297409, the control device 1003 and the fuel cell 1004 are provided on the lateral bar 1001b in the middle stage of the frame 1001 such that the back sides of the control device 1003 and the fuel cell 1004 face each other. In the structure, when the fuel cell 1004 requires maintenance, the control device 1003 needs to be removed, or the fuel cell 1004 needs to be accessed from the side opposite to the control device 1003. Therefore, the maintenance operation is considerably complicated, and the maintenance performance is low.

Further, in Japanese Laid-Open Patent Publication No. 2006-086017, the fuel cell 1012 and the fuel reformer are provided at upper positions of the case 1011. The power converter 1015, the water supply apparatus 1014, and the gas supply apparatus 1013 are provided at lower positions of the case 1011. In the layout, when the power converter 1015, the water supply apparatus 1014, and the gas supply apparatus 1013 require maintenance, the operator needs to work under the case 1011. Therefore, the maintenance performance is low.

Further, in Japanese Laid-Open Patent Publication No. 2006-140164, the purifier 1022, the ion exchanger 1023, and the desulfurizer 1024 are provided adjacent to the front panel 1025 of the package 1021. In the structure, the layout of the components in the package 1021 cannot be determined freely, and the maintenance performance of electrical components is low.

The present invention has been made taking the problems of this type into account, and an object of the present invention is to provide a fuel cell system having a simple and compact structure in which maintenance of components in a casing can be performed easily, and improvement in the maintenance performance can be achieved suitably. The present invention relates to a fuel cell system including a fuel cell module, a combustor, a fuel gas supply apparatus, an oxygen-containing gas supply apparatus, a water supply apparatus, a power converter, a control device, and a casing containing the fuel cell module, the combustor, the fuel gas supply apparatus, the oxygen-containing gas supply apparatus, the water supply apparatus, the power converter, and the control device. The fuel cell module generates electrical energy by electrochemical reactions of a fuel gas and an oxygen-containing gas. The combustor raises the temperature of the fuel cell module. The fuel gas supply apparatus supplies the fuel gas to the fuel cell module. The oxygen-containing gas supply apparatus supplies the oxygen-containing gas to the fuel cell module. The water supply apparatus supplies water to the fuel cell module. The power converter converts direct current electrical energy generated in the fuel cell module to electrical energy according to requirements specification. The control device controls the amount of electrical energy generated in the fuel cell module. The casing includes a casing body and a slide door that is slidable with respect to the casing body, and the power converter and the control device are attached onto the slide door.

In the present invention, the slide door can slide with respect to the casing body, and the power converter and the control device are attached to the slide door. In the structure, simply by sliding the slide door, the maintenance operation of the power converter and the control device can be performed. Further, maintenance operation of other components placed inside the power converter and the control device can be performed easily. Thus, with simple and compact structure, maintenance operation of the components in the casing is performed easily, and improvement in the maintenance performance is achieved.

The above and other objects, features, and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
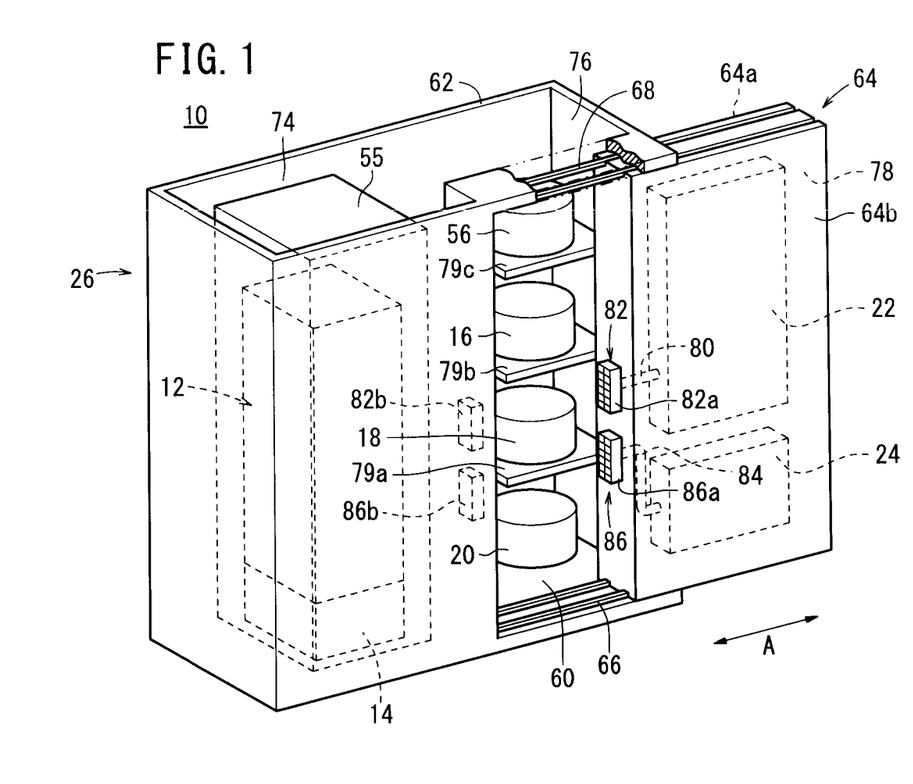
FIG. 1 is a perspective view schematically showing a fuel cell system according to a first embodiment of the present invention.
Figure 2:
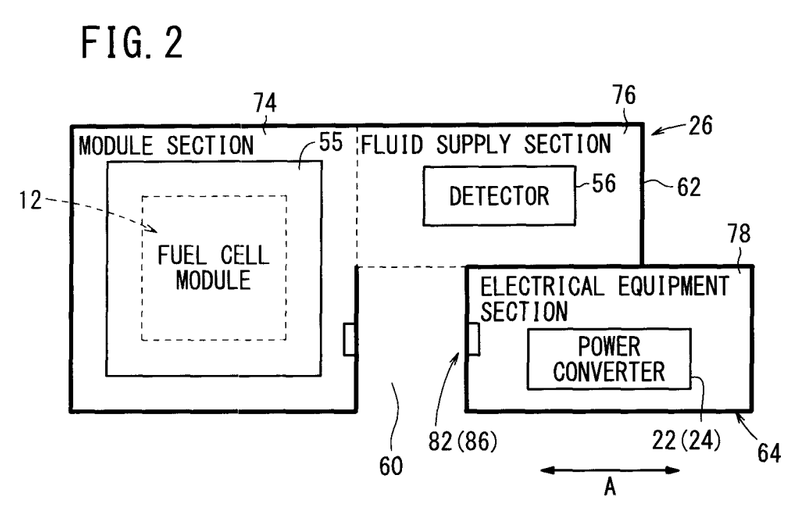
FIG. 2 is a plan view showing the fuel cell system.
Figure 3:
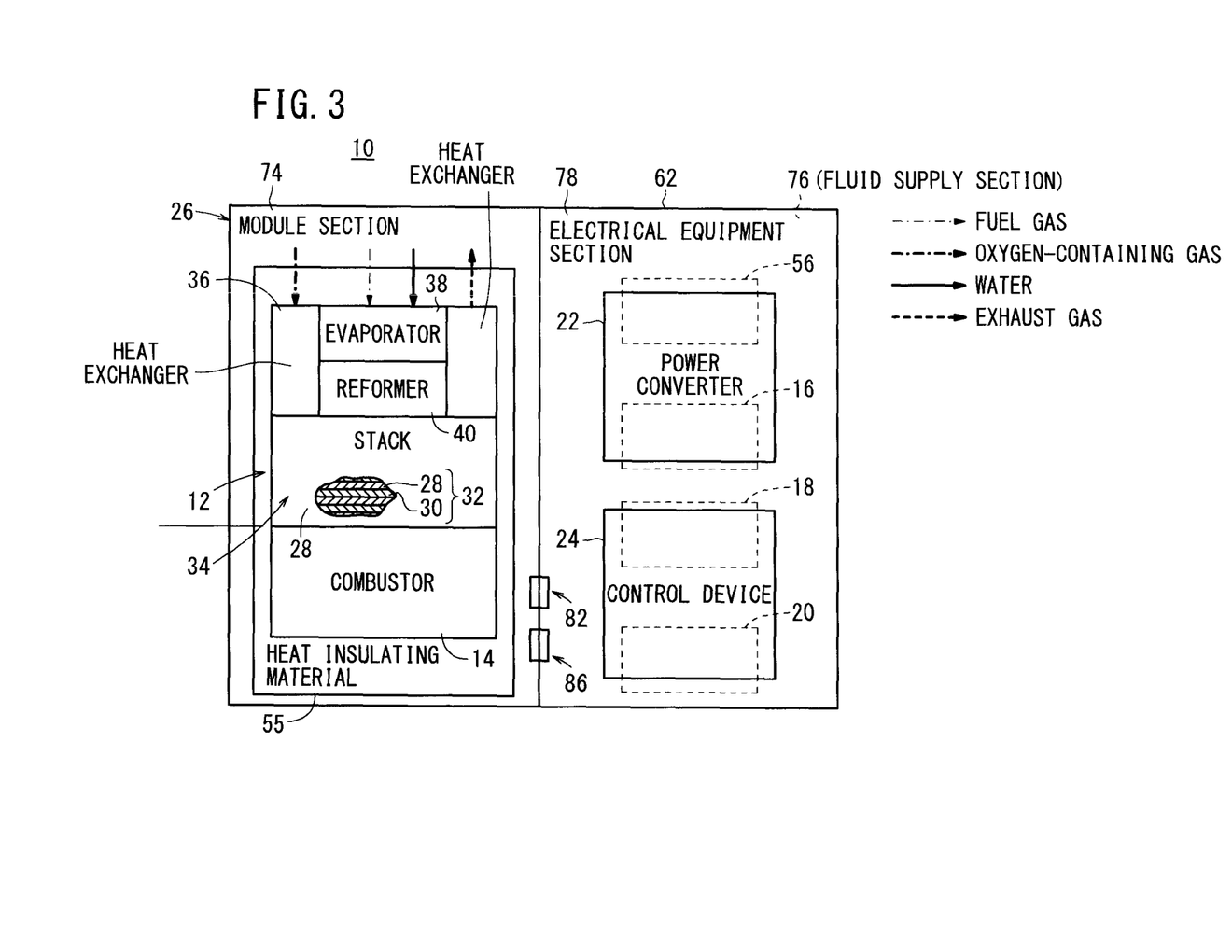
FIG. 3 is a front view showing the fuel cell system.

As shown in FIGS. 1 to 3, a fuel cell system 10 according to a first embodiment of the present invention is used in various applications, including stationary and mobile applications. For example, the fuel cell system 10 is mounted in a vehicle.

The fuel cell system 10 includes a fuel cell module 12 for generating electrical energy in power generation by electrochemical reactions of a fuel gas (hydrogen gas) and an oxygen-containing gas (air), a combustor 14 for raising the temperature of the fuel cell module 12, a fuel gas supply apparatus (including a fuel gas pump) 16 for supplying the fuel gas to the fuel cell module 12, an oxygen-containing gas supply apparatus (including an air pump) 18 for supplying an oxygen-containing gas to the fuel cell module 12, a water supply apparatus (including a water pump) 20 for supplying water to the fuel cell module 12, a power converter 22 for converting the direct current electrical energy generated in the fuel cell module 12 to electrical energy according to the requirements specification, and a control device 24 for controlling the amount of electrical energy generated in the fuel cell module 12. The fuel cell module 12, the combustor 14, the fuel gas supply apparatus 16, the oxygen-containing gas supply apparatus 18, the water supply apparatus 20, the power converter 22, and the control device 24 are disposed in a single casing 26.

As shown in FIG. 3, the fuel cell module 12 includes a fuel cell stack 34 formed by stacking a plurality of solid oxide fuel cells 32 in a vertical direction. The fuel cells 32 are formed by stacking electrolyte electrode assemblies 28 and separators 30. Though not shown, each of the electrolyte electrode assemblies 28 includes a cathode, an anode, and a solid electrolyte (solid oxide) interposed between the cathode and the anode. For example, the electrolyte is made of ion-conductive solid oxide such as stabilized zirconia.

At an upper end of the fuel cell stack 34 in the stacking direction, a heat exchanger 36 for heating the oxygen-containing gas before the oxygen-containing gas is supplied to the fuel cell stack 34, an evaporator 38 for evaporating water to produce a mixed fuel of a raw fuel (e.g., city gas) chiefly containing hydrocarbon and water vapor, and a reformer 40 for reforming the mixed fuel to produce a reformed gas are provided.

Instead of adopting the above layout, the heat exchanger 36, the evaporator 38, and the reformer 40 may be provided at a lower end of the fuel cell stack 34. In this case, the position of the combustor 14 is also reversed. Moreover, various layouts can be adopted. For example, the combustor 14, the fuel cell stack 34, the heat exchanger 36, the evaporator 38, and the reformer 40 may be provided on any of the upper side, the lower side, the left side, and the right side. The reformer 40 is a preliminary reformer for reforming higher hydrocarbon ($C_{2+}$) such as ethane ($C_2H_6$), propane ($C_3H_8$), and butane ($C_4H_{10}$) contained in the city gas, into raw fuel gas chiefly containing methane ($CH_4$), by steam reforming. The operating temperature of the reformer 40 is several hundred ° C.

The operating temperature of the fuel cell 32 is high, at several hundred ° C. In the electrolyte electrode assembly 28, methane in the fuel gas is reformed to obtain hydrogen, and the hydrogen is supplied to the anode.

In the heat exchanger 36, a consumed reactant gas discharged from the fuel cell stack 34 (hereinafter also referred to as an exhaust gas or a combustion exhaust gas) and air as a fluid to be heated flow in a counterflow manner thereby for heating the air.

Figure 4:
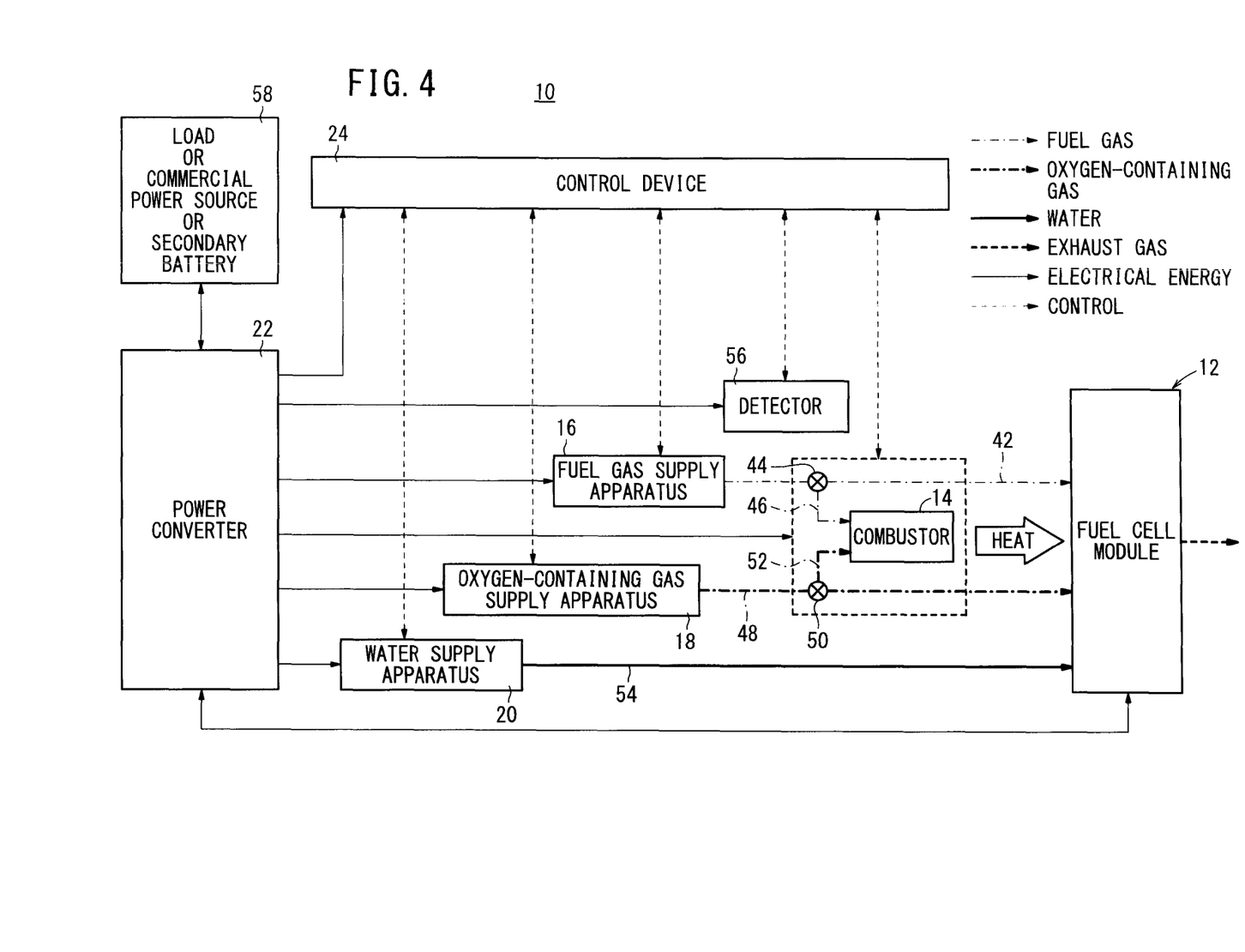
FIG. 4 is a circuit diagram showing the fuel cell system.

As shown in FIG. 4, the fuel gas supply apparatus 16 is connected to a raw fuel channel 42, and a raw fuel branch channel 46 is connected to a position in the middle of the raw fuel channel 42 through a switching valve 44. The raw fuel branch channel 46 is connected to the combustor 14. The oxygen-containing gas supply apparatus 18 is connected to the air supply pipe 48, and the air branch channel 52 is connected to a switching valve 50 provided at a position in a middle of the air supply pipe 48. The air branch channel 52 is connected to the combustor 14.

For example, the combustor 14 has a burner, and as described above, the raw fuel and the air are supplied to the combustor 14. Instead of the burner, other means (e.g., electric heater) may be adopted. In this case, the raw fuel, the air, and electricity should be supplied selectively as necessary. The water supply apparatus 20 is connected to a water channel 54. The fuel cell module 12 and the combustor 14 are surrounded by heat insulating material 55 (see FIG. 3).

As shown in FIG. 4, the fuel gas supply apparatus 16, the oxygen-containing gas supply apparatus 18, and the water supply apparatus 20 are controlled by the control device 24. A detector 56 for detecting the fuel gas is electrically connected to the control device 24. For example, a commercial power source 58 (or other components such as a load or a secondary battery) is connected to the power converter 22.

As shown in FIGS. 1 to 3, the casing 26 includes a casing body 62 having an opening 60 at least on one surface (on a front surface), and a slide door 64 attached to the casing body 62. The opening 60 can be opened/closed by the slide door 64. The slide door 64 is slidable with respect to the casing body 62 in directions indicated by arrow A through guide members 66, 68 made up of a pair of upper and lower slide rails or the like extending horizontally (see FIG. 1).

The guide members 66, 68 include unillustrated stoppers. By releasing the stoppers, the slide door 64 can be removed from the guide members 66, 68. That is, the slide door 64 is attachable to and detachable from the casing body 62. The guide members 66, 68 may comprise various slider structures such as door rollers or door bearings, in addition to the slide rails.

The space in the casing body 62 is divided into a module section 74, a fluid supply section 76, and an electrical equipment section 78. It is sufficient that the module section 74, the fluid supply section 76, and the electrical equipment section 78 are provided as separate spaces. Partition plates or the like may be provided as necessary. In FIGS. 1 to 3, the module section 74 is provided on the left side in the casing body 62, whereas the fluid supply section 76 and the electrical equipment section 78 are provided on the right side (lateral side) in the casing body 62. The fluid supply section 76 and the electrical equipment section 78 are provided in parallel to each other. The fluid supply section 76 is provided on the back side in the casing body 62, and the electrical equipment section 78 is provided on the front side.

The fuel cell module 12 and the combustor 14 are placed in the module section 74. The fuel cell module 12 is provided above the combustor 14.

The fuel gas supply apparatus 16, the oxygen-containing gas supply apparatus 18, the water supply apparatus 20, and the detector 56 are placed in the fluid supply section 76. The water supply apparatus 20 is provided at the lowermost position of the fluid supply section 76. The oxygen-containing gas supply apparatus 18 is disposed above the water supply apparatus 20, the fuel gas supply apparatus 16 is disposed above the oxygen-containing gas supply apparatus 18, and the detector 56 is disposed above the fuel gas supply apparatus 16. For example, the oxygen-containing gas supply apparatus 18, the fuel gas supply apparatus 16, and the detector 56 are placed on supporting plates 79a, 79b, and 79c, respectively (see FIG. 1).

The power converter 22 and the control device 24 are placed in the electrical equipment section 78. The power converter 22 and the control device 24 are fixed onto an inner panel 64a of the slide door 64. The power converter 22 is provided above the control device 24. The power converter 22 is connected to a wire 80, which is connected to a detachable wire connector 82. The control device 24 is connected to a wire 84, which is connected to a detachable wire connector 86. The slide door 64 further includes an outer panel 64b which is attachable to and detachable from the slide door 64.

Figure 5:
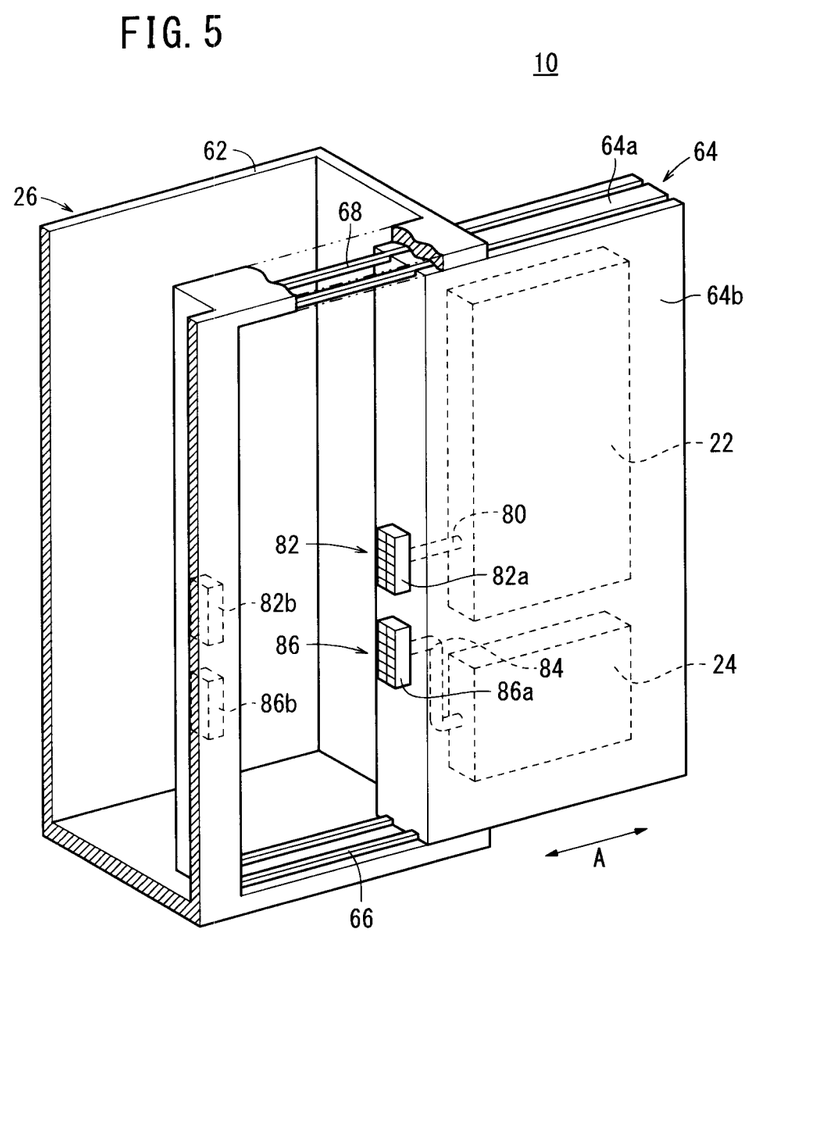
FIG. 5 is a fragmentary perspective view showing the fuel cell system.

As shown in FIGS. 1 and 5, the wire connectors 82, 86 include first connectors 82a, 86a connected to the wires 80, 84 and which are fixed onto a side portion of the slide door 64, and second connectors 82b, 86b fixed onto a side portion of the casing body 62. When the slide door 64 slides in the directions indicated by arrow A, the first connectors 82a, 86a are attached to/detached from the second connectors 82b, 86b. The slide door 64 slides toward the opposite side to the module section 74.

Though not shown, the casing 26 may be supported on a rotation table or a slide rail to adopt a movable structure.

Operation of the fuel cell system 10 will be described below.

As shown in FIG. 4, by operation of the fuel gas supply apparatus 16, for example, a raw fuel such as the city gas (including $CH_4$, $C_2H_6$, $C_3H_8$, $C_4H_{10}$) is supplied to the raw fuel channel 42. Further, by operation of the water supply apparatus 20, water is supplied to the water channel 54, and by operation of the oxygen-containing gas supply apparatus 18, the oxygen-containing gas such as the air is supplied to the air supply pipe 48.

As shown in FIG. 3, in the evaporator 38, the raw fuel flowing through the raw fuel channel 42 is mixed with the water vapor, and a mixed fuel is obtained. The mixed fuel is supplied to the inlet of the reformer 40. The mixed fuel undergoes steam reforming in the reformer 40. Thus, hydrocarbon of $C_{2+}$ is removed (reformed), and a reformed gas (fuel gas) chiefly containing methane is obtained. The reformed gas flows through the outlet of the reformer 40, and the reformed gas is supplied to the fuel cell stack 34.

Thus, the methane in the reformed gas is reformed, and hydrogen gas is obtained. The fuel gas chiefly containing the hydrogen gas is supplied to the anodes (not shown).

The air supplied from the air supply pipe 48 to the heat exchanger 36 moves along the heat exchanger 36, and is heated to a predetermined temperature by heat exchange with the exhaust gas as described later. The air heated by the heat exchanger 36 is supplied to the fuel cell stack 34, and the air is supplied to the cathodes (not shown).

Thus, in each of the electrolyte electrode assemblies 28, by electrochemical reactions of the fuel gas and the air, power generation is performed. The hot exhaust gas (several hundred ° C.) discharged to the outer circumferential region of each of the electrolyte electrode assemblies 28 flows through the heat exchanger 36, and heat exchange with the air is carried out. The air is heated to a predetermined temperature, and the temperature of the exhaust gas is decreased.

The exhaust gas is supplied to the evaporator 38, and evaporates the water passing through the water channel 54. After the exhaust gas passes through the evaporator 38, the exhaust gas is discharged to the outside.

In the first embodiment, the casing body 62 has the slide door 64 which is slidable with respect to the casing body 62 in the directions indicated by arrow A. Further, the power converter 22 and the control device 24 are attached onto the slide door 64. In the structure, as shown in FIG. 1, when the slide door 64 slides in a direction to separate away from the module section 74 thereby to open the opening 60, the power converter 22 and the control device 24 accordingly move to the outside of the casing body 62. Thus, when the outer panel 64b is removed, maintenance operation of the power converter 22 and the control device 24 can be performed easily.

Further, when the slide door 64 is slid, the fluid supply section 76 is accessible from the front face of the casing body 62, i.e., through the opening 60. Specifically, the power converter 22 and the control device 24 provided on the front side of the fluid supply section 76 move to the outside together with the slide door 64. Therefore, maintenance operation of the fuel gas supply apparatus 16, the oxygen-containing gas supply apparatus 18, the water supply apparatus 20, and the detector 56 provided in the fluid supply section 76 can be performed easily because the fluid supply section 76 and the electrical equipment section 78 are provided on the lateral side of the module section 74 such that the fluid supply section 76 is provided on the back side, whereas the electrical equipment section 78 is provided on the front side.

Further, maintenance operation of the fuel cell module 12 or the like provided in the module section 74 can be performed suitably because the slide door 64 moves to the opposite side of the module section 74.

Thus, with simple and compact structure, maintenance operation of components in the casing body 62 can be performed easily and reliably, and improvement in the maintenance performance is achieved.

Further, the power converter 22 is provided above the control device 24. In the structure, the control device 24 is provided at a lower position of the fuel cell system 10. When the fuel cell system 10 gets wet, firstly, operation of the control device 24 is stopped. Thus, overall operation of the fuel cell system 10 is stopped.

The slide door 64 is slidable horizontally, and includes the wire connectors 82, 86, to which the wires 80, 84 of the power converter 22 and the control device 24 are detachably connected respectively. The wire connectors 82, 86 include the first connectors 82a, 86a connected to the wires 80, 84 and which are fixed onto the slide door 64, and the second connectors 82b, 86b fixed onto the casing body 62 side.

Thus, if the slide door 64 is slid in a direction to open the opening 60, then the first connectors 82a, 86a, which are fixed onto the slide door 64, are detached from the second connectors 82b, 86b, which are fixed onto the casing body 62. In contrast, if the slide door 64 is slid in a direction to close the opening 60, then the first connectors 82a, 86a are connected to the second connectors 82b, 86b. Therefore, maintenance operation of the power converter 22 and the control device 24 can be performed easily and swiftly.

Further, in the state where the power converter 22 and the control device 24 are attached to the slide door 64, the slide door 64 can be detached from the casing body 62 through the guide members 66, 68. In this manner, improvement in the maintenance performance of the power converter 22 and the control device 24 is achieved suitably.

Further, the water supply apparatus 20 is provided at least below the fuel gas supply apparatus 16. In the first embodiment, the water supply apparatus 20 is provided at the lowermost position of the fluid supply section 76. In the structure, even if water leakage occurs in the water supply apparatus 20, the fuel gas supply apparatus 16 and the oxygen-containing gas supply apparatus 18 do not get wet.

Further, the fuel gas supply apparatus 16 is provided above the oxygen-containing gas supply apparatus 18. The oxygen-containing gas supply apparatus 18 has an air pump, and the fuel gas supply apparatus 16 has a fuel gas pump. In particular, in the case where the fuel cell system 10 has a large A/F (air/fuel gas) ratio, the volume of the air pump is larger than the volume of the fuel gas pump, and the air pump has a large weight.

Thus, by providing the oxygen-containing gas supply apparatus 18 below the fuel gas supply apparatus 16, stability in the layout of the components is improved. Further, even if leakage of the fuel gas from the fuel gas supply apparatus 16 occurs, it is possible to prevent the fuel gas from being sucked into the oxygen-containing gas supply apparatus 18.

Further, the fuel cell system 10 has the detector 56 for detecting the fuel gas, and the detector 56 is provided above the fuel gas supply apparatus 16. In the first embodiment, the detector 56 is provided at the uppermost position of the fluid supply section 76. In the structure, even if leakage of the fuel gas from the fuel gas supply apparatus 16 occurs, the gas leakage can be detected rapidly and reliably by the detector 56.

Further, it is preferable that the fuel cell module 12 adopts a high temperature fuel cell system, for example, a solid oxide fuel cell (SOFC) module. In this case, the desired advantages are obtained.

Figure 6:
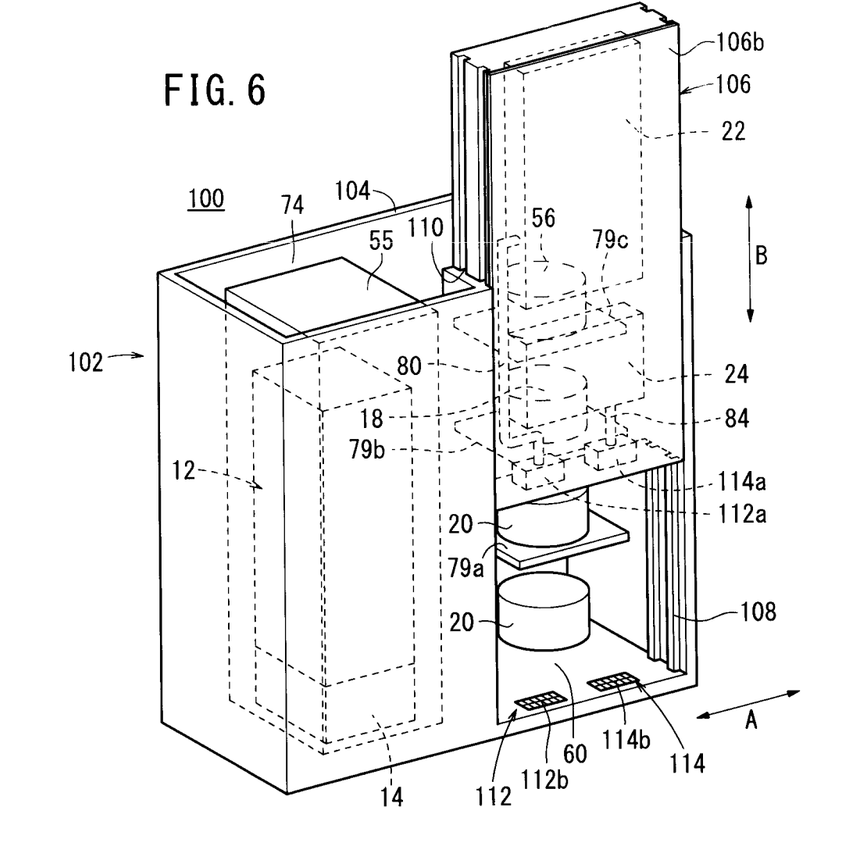
FIG. 6 is a perspective view schematically showing a fuel cell system according to a second embodiment of the present invention.

FIG. 6 is a perspective view schematically showing a fuel cell system 100 according to a second embodiment of the present invention.

The constituent elements that are identical to those of the fuel cell system 10 according to the first embodiment are labeled with the same reference numerals, and descriptions thereof will be omitted. Further, also in third and later embodiments, the constituent elements that are identical to those of the fuel cell system 10 according to the first embodiment are labeled with the same reference numerals, and descriptions thereof will be omitted.

The fuel cell system 100 includes a casing 102, and the casing 102 has a casing body 104 and a slide door 106 that is slidable with respect to the casing body 104 in vertical directions indicated by arrow B.

The slide door 106 slides under guiding action of guide members 108, 110 extending vertically at right and left sides thereof. The guide members 108, 110 have stoppers (not shown) for fixing the slide door 106 at a certain height and which enable the slide door 106 to be attached thereto and detached therefrom.

Inside the slide door 106, the power converter 22 and the control device 24 are installed. At an outer surface of the slide door 106, an outer panel (decorative plate) 106b is detachably provided so as to cover the power converter 22 and the control device 24.

The wire 80 connected to the power converter 22 is connected to a detachable wire connector 112, whereas the wire 84 connected to the control device 24 is connected to a detachable wire connector 114. The wire connectors 112, 114 includes first connectors 112a, 114a connected to the wires 80, 84 and which are fixed onto a lower portion of the slide door 106, and second connectors 112b, 114b fixed onto a bottom portion of the casing body 62. When the slide door 106 slides in directions indicated by arrow B, the first connectors 112a, 114a are automatically attached to/detached from the second connectors 112b, 114b.

The second embodiment is similar in construction to the first embodiment except that the slide door 106 slides vertically. Thus, advantageously the second embodiment can suitably handle with a case where the casing 102 does not have enough space therein particularly in the directions indicated by arrow A.

Figure 7:
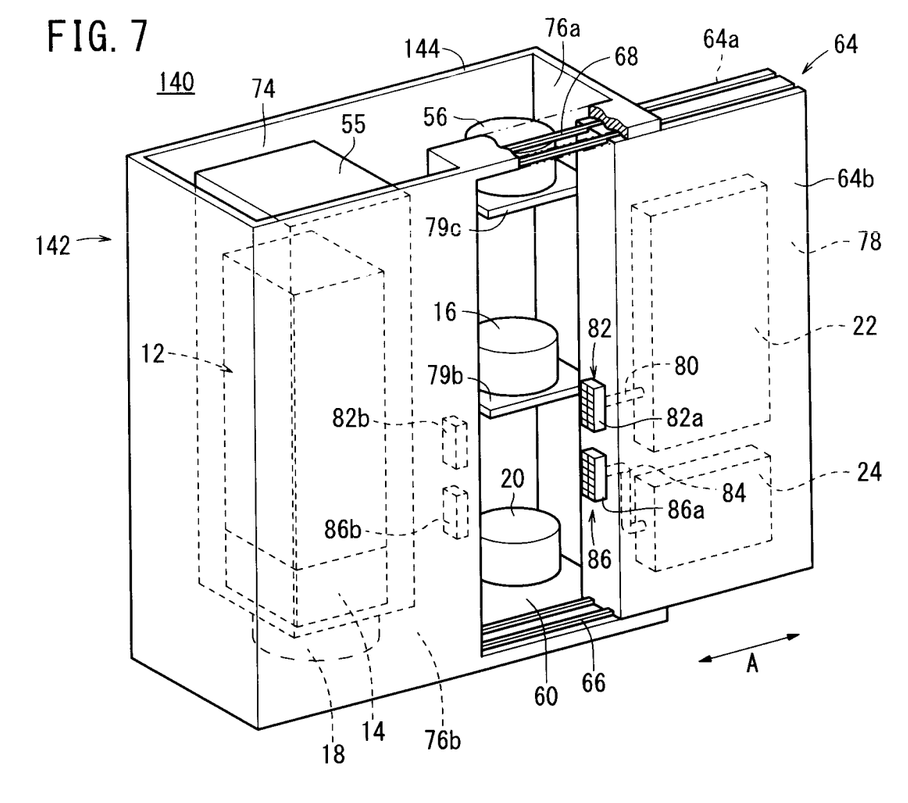
FIG. 7 is a perspective view schematically showing a fuel cell system according to a third embodiment of the present invention.

FIG. 7 is a perspective view schematically showing a fuel cell system 140 according to a third embodiment of the present invention.

Figure 8:
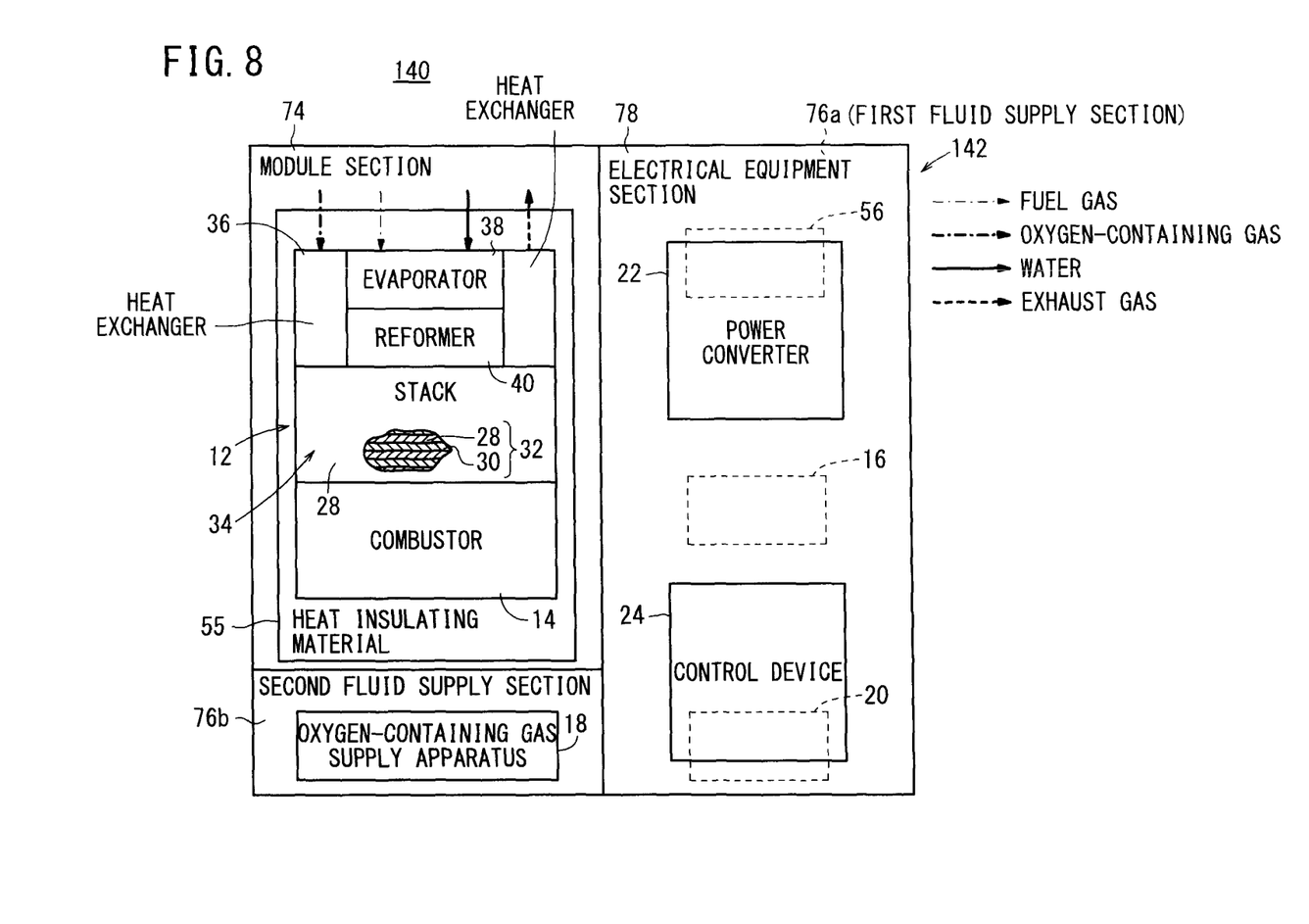
FIG. 8 is a front view showing the fuel cell system.

The fuel cell system 140 includes a casing 142, and the space in the casing 142 is divided into a module section 74, a first fluid supply section 76a, a second fluid supply section 76b, and an electrical equipment section 78. The water supply apparatus 20, the fuel gas supply apparatus 16, and the detector 56 are provided in the first fluid supply section 76a, and the oxygen-containing gas supply apparatus 18 is placed in the second fluid supply section 76b. The second fluid supply section 76b is provided under the module section 74 (see FIGS. 7 and 8).

The casing 142 has a casing body 144 and a slide door 64 that is slidable with respect to the casing body 144 in directions indicated by arrow A. The slide door 64 is guided by guide members 66, 68.

In the third embodiment, the same advantages as in the case of the first embodiment are obtained.

Figure 9:
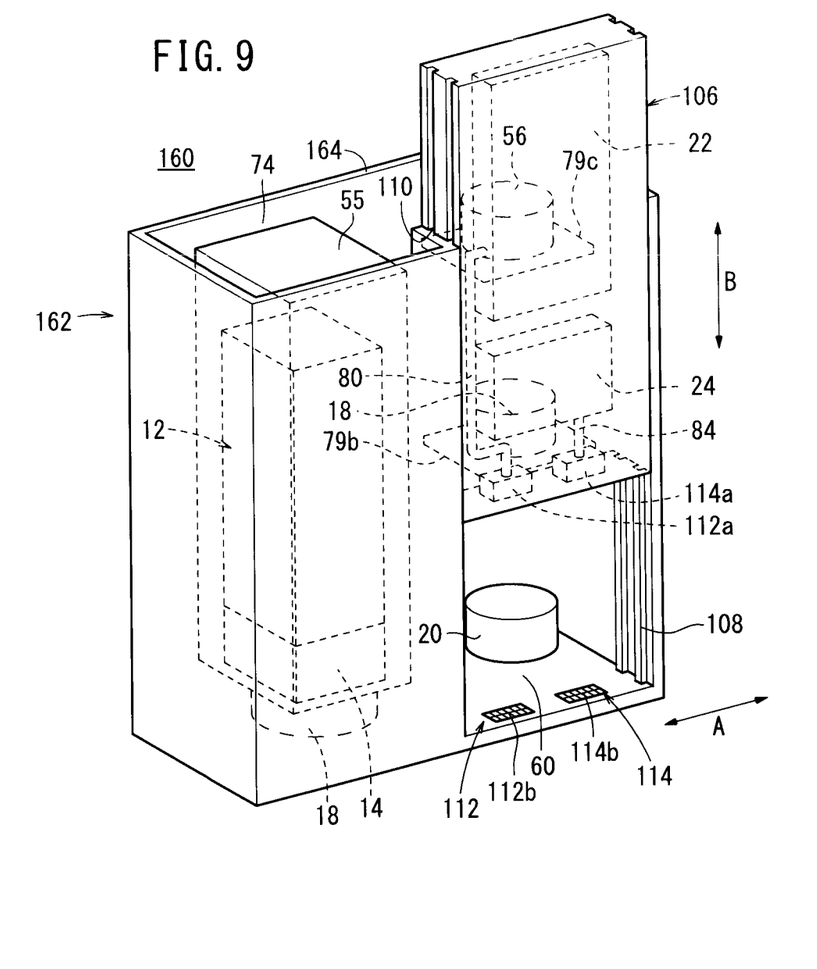
FIG. 9 is a perspective view schematically showing a fuel cell system according to a fourth embodiment of the present invention.

FIG. 9 is a perspective view schematically showing a fuel cell system 160 according to a fourth embodiment of the present invention.

The fuel cell system 160 includes a casing 162, and the casing 162 has a casing body 164 and a slide door 106 that is slidable with respect to the casing body 164 in vertical directions through guide members 108, 110. The power converter 22 and the control device 24 are fixed inside of the slide door 106, and wire connectors 112, 114 are further provided.

In the fourth embodiment, the same advantages as in the case of the second embodiment are obtained.

While the invention has been particularly shown and described with reference to preferred embodiments, it will be understood that variations and modifications can be effected thereto by those skilled in the art without departing from the scope of the invention as defined by the appended claims.

The invention claimed is:

1. A fuel cell system comprising:
a fuel cell module for generating electrical energy by electrochemical reactions of a fuel gas and an oxygen-containing gas;
a combustor for raising the temperature of the fuel cell module;
a fuel gas supply apparatus for supplying the fuel gas to the fuel cell module;
an oxygen-containing gas supply apparatus for supplying the oxygen-containing gas to the fuel cell module;
a water supply apparatus for supplying water to the fuel cell module;
a power converter for converting direct current electrical energy generated in the fuel cell module to electrical energy according to requirements specification;
a control device for controlling the amount of electrical energy generated in the fuel cell module; and
a casing containing the fuel cell module, the combustor, the fuel gas supply apparatus, the oxygen-containing gas supply apparatus, the water supply apparatus, the power converter, and the control device,
wherein the casing includes a casing body defining an inferior and an opening, and a slide door that is slidable with respect to the casing body to open/close the opening of the casing body, the slide door is slidable between an open position at which the opening of the casing body is opened and a closed position at which the opening of the casing body is closed, the slide door having an inner surface facing the interior of the casing body when the slide door is in the closed position, and an outer surface opposite to the inner surface;
the power converter and the control device are attached onto the outer surface of the slide door; and
the casing further includes an outer panel detachably provided on the outer surface of the slide door to cover the power converter and the control device, and the outer panel is detachable from the outer surface of the slide door to uncover the power converter and the control device while the slide door is in the closed position.

2. The fuel cell system, comprising:
a fuel cell module for generating electrical energy by electrochemical reactions of a fuel gas and an oxygen-containing gas;
a combustor for raising the temperature of the fuel cell module;
a fuel gas supply apparatus for supplying the fuel gas to the fuel cell module;
an oxygen-containing gas supply apparatus for supplying the oxygen-containing gas to the fuel cell module;
a water supply apparatus for supplying water to the fuel cell module;
a power converter for converting direct current electrical energy generated in the fuel cell module to electrical energy according to requirements specification;
a control device for controlling the amount of electrical energy generated in the fuel cell module; and
a casing containing the fuel cell module, the combustor, the fuel gas supply apparatus, the oxygen-containing gas supply apparatus, the water supply apparatus, the power converter, and the control device,
wherein the casing includes a casing body and a slide door that is slidable with respect to the casing body;
the power converter and the control device are attached onto the slide door; and
the power converter is provided above the control device.

3. The fuel cell system according to claim 1, wherein the slide door is slidable horizontally or vertically;
the slide door includes wire connectors for detachably connecting wires of the power converter and the control device to the wire connectors; and
the wire connectors includes:
first connectors to which the wires of the power converter and the control device are connected and which are fixed onto the slide door; and
second connectors fixed onto the casing body side, wherein when the slide door slides, the first connectors are attached to/detached from the second connectors.

4. The fuel cell system according to claim 1, wherein the slide door is detachable from the casing body in a state where the power converter and the control device are attached onto the slide door.

5. The fuel cell system according to claim 1, wherein the casing includes therein:
a module section where the fuel cell module is provided;
a fluid supply section where at least the fuel gas supply apparatus and the water supply apparatus are provided; and
an electrical equipment section where the power converter and the control device are provided, and
wherein the fluid supply section and the electrical equipment section are arranged in parallel on a lateral side of the module section such that the fluid supply section is provided on the back side and the electrical equipment section is provided on the front side; and
components of the electrical equipment section are attached onto the slide door, and the slide door slides toward an opposite side to the module section.

6. The fuel cell system according to claim 1, wherein the water supply apparatus is provided at least below the fuel gas supply apparatus.

7. The fuel cell system according to claim 1, wherein the fuel gas supply apparatus is provided above the oxygen-containing gas supply apparatus.

8. The fuel cell system according to claim 1, further comprising a detector for detecting the fuel gas, wherein the detector is provided above the fuel gas supply apparatus.

9. The fuel cell system according to claim 1, wherein the fuel cell module is a solid oxide fuel cell module.

10. The fuel cell system according to claim 9, wherein the solid oxide fuel cell module comprises:
- a solid oxide fuel cell stack formed by staking a plurality of solid oxide fuel cells, the solid oxide fuel cells each including at least an electrolyte electrode assembly and a separator stacked together, the electrolyte electrode assembly including an anode, a cathode, and an electrolyte interposed between the anode and the cathode;
- a heat exchanger for heating an oxygen-containing gas before the oxygen-containing gas is supplied to the solid oxide fuel cell stack;
- an evaporator for evaporating water to produce a mixed fuel of a raw fuel chiefly containing hydrocarbon and water vapor; and
- a reformer for reforming the mixed fuel to produce a reformed gas.

11. The fuel cell system according to claim 1, wherein the slide door entirely closes the casing body opening when the slide door is in the closed position.

12. The fuel cell system according to claim 1, wherein the slide door is slidable horizontally or vertically;
- the slide door includes wire connectors for detachably connecting wires of the power converter and the control device to the wire connectors; and
- the wire connectors include:
- first connectors to which the wires of the power converter and the control device are connected and which are fixed onto the slide door; and
- second connectors fixed onto the casing body side, wherein when the slide door slides, the first connectors are attached to/detached from the second connectors,
- wherein the first connectors and second connectors are provided such that the first connectors are attached to the second connectors when the slide door is in the closed position, and the first connectors are detached from the second connectors when the slide door is moved away from the closed position toward the open position.

13. The fuel cell system according to claim 1, wherein the power converter and the control device are contained within the slide door.

14. The fuel cell system according to claim 2, wherein the control device is disposed at a lower position of the fuel cell system such that, when the fuel cell system gets wet, operation of the control device is stopped first.

* * * * *